(12) United States Patent
Richards et al.

(10) Patent No.: US 11,595,208 B2
(45) Date of Patent: Feb. 28, 2023

(54) SELF-SERVICE DEVICE ENCRYPTION KEY ACCESS

(71) Applicant: VMware, Inc., Palo Alto, CA (US)

(72) Inventors: John Richards, Atlanta, GA (US); Craig Farley Newell, Atlanta, GA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/498,460

(22) Filed: Oct. 11, 2021

(65) Prior Publication Data
US 2022/0029804 A1 Jan. 27, 2022

Related U.S. Application Data

(63) Continuation of application No. 16/743,558, filed on Jan. 15, 2020, now Pat. No. 11,159,316.

(51) Int. Cl.
*H04L 29/06* (2006.01)
*H04L 9/08* (2006.01)
(Continued)

(52) U.S. Cl.
CPC ......... *H04L 9/0894* (2013.01); *H04L 9/0861* (2013.01); *H04L 9/3297* (2013.01); *H04L 63/068* (2013.01); *H04L 63/083* (2013.01)

(58) Field of Classification Search
None
See application file for complete search history.

(56) References Cited

U.S. PATENT DOCUMENTS 6,941,459 B1 * 9/2005 Hind ............... H04L 9/088
705/76
8,489,893 B2 7/2013 Damian et al.
(Continued)

OTHER PUBLICATIONS

Mazumdar, Bodhisatwa; Mukhopadhyay, Debdeep. Construction of Rotation Symmetric S-Boxes with High Nonlinearity and Improved DPA Resistivity. IEEE Transactions on Computers, vol. 66, Issue 1. https://ieeexplore.ieee.org/stamp/stamp.jsp?tp=&arnumber=7470605 (Year: 2017).*

(Continued)

*Primary Examiner* — Jeremiah L Avery
(74) *Attorney, Agent, or Firm* — Thomas | Horstemeyer, LLP

(57) ABSTRACT

Disclosed are various embodiments for providing access to a recovery key of a managed device and rotating the recovery key after it has been accessed. In one example, among others, a system includes a computing device and program instructions. The program instructions can cause the computing device to store a first recovery key for a first managed computing device. The first recovery key is configured to access an encrypted data store of the first managed computing device. A request is received for the first recovery key from a second managed computing device. The first recovery key is transmitted for display on the second managed computing device. A key rotation command is generated for a command queue of the first managed computing device to rotate the first recovery key after transmitting the first recovery key. The second recovery key is received from the second computing device.

20 Claims, 3 Drawing Sheets

(51) Int. Cl.
*H04L 9/32* (2006.01)
*H04L 9/40* (2022.01)

(56) References Cited

U.S. PATENT DOCUMENTS

| | | | |
|---|---|---|---|
| 8,842,841 B2 | 9/2014 | Hook et al. | |
| 10,003,584 B1* | 6/2018 | Roth | H04L 63/068 |
| 10,992,469 B2* | 4/2021 | Cheng | H04L 9/0894 |
| 2011/0191595 A1* | 8/2011 | Damian | H04L 9/06 |
| | | | 713/189 |
| 2014/0164776 A1* | 6/2014 | Hook | G06F 21/6218 |
| | | | 713/171 |
| 2019/0229908 A1* | 7/2019 | Peddada | G06F 21/602 |
| 2019/0229909 A1* | 7/2019 | Patel | H04L 9/0894 |
| 2020/0244445 A1* | 7/2020 | Ponnusamy | G06F 21/575 |

OTHER PUBLICATIONS

Kanyamee, Kanokwan; Sathitwiriyawong, Chanboon. A Secure Multiple-Agent Cryptographic Key Recovery System. 2009 IEEE International Conference on Information Reuse & Integration. https://ieeexplore.ieee.org/stamp/stamp.jsp?tp=&arnumber=5211601 (Year: 2009).*

Wang, Hua et al. Resilient Quantum Key Distribution (QKD)-Integrated Optical Networks With Secret-Key Recovery Strategy. IEEE Access, vol. 7. https://ieeexplore.IEEE.org/stamp/stamp.jsp?tp=&arnumber=8708272 (Year: 2019).*

Kogiso, Kiminao. Attack Detection and Prevention for Encrypted Control Systems by Application of Switching-Key Management. 2018 IEEE Conference on Decision and Control (CDC). https://ieeexplore.ieee.org/stamp/stamp.jsp?tp=&arnumber=8619221 (Year: 2018).‡

Guo, Qian et al. A Key Recovery Reaction Attack on QC-MDPC. IEEE Transactions on Information Theory, vol. 65, Issue: 3. https://ieeexplore.ieee.org/stamp/stamp.jsp?tp=&arnumber=8502112 (Year: 2018).‡

Guo, Qian et al. A Key Recovery Reaction Attack on QC-MDPC. IEEE Transactions on Information Theory, vol. 65, Issue 3. https://ieeexplore.ieee.org/stamp/stamp.jsp?tp=&arnumber8502112.

Kogiso, Kiminao. Attack Detection and Prevention for Encrypted Control Systems by Application of Switching-Key Management. 2018 IEEE Conference on Decision and Control (CDC). https://ieeexplore.ieee.org/stamp/stamp.jsp?tp=&arnumber=8619221.

* cited by examiner
‡ imported from a related application

SELF-SERVICE DEVICE ENCRYPTION KEY ACCESS

CROSS-REFERENCE TO RELATED APPLICATIONS

This application is a continuation of and claims the benefit of U.S. patent application Ser. No. 16/743,558, entitled "SELF-SERVICE DEVICE ENCRYPTION KEY ACCESS" and filed Jan. 15, 2020, which is hereby incorporated by reference in their entirety.

BACKGROUND

Oftentimes, enterprise organizations have a policy for encrypting the data stored on employee computing devices for security reasons. In case an employee device is lost or stolen, the encrypted hard drive prevents unauthorized users from accessing enterprise data. In many cases, operating system vendors have a disk encryption feature that encrypts all data on a computing device and requires user authentication from a boot-up stage. In the event that the user forgets the password, a recovery key can be used as a backup to access the computing device.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure includes examples related to providing access to a recovery key of a managed device and rotating the recovery key after it has been accessed. In many cases, enterprise organizations have a policy for encrypting the data stored on employee computing devices to protect enterprise data from unauthorized users. Many operating system vendors offer a disk encryption feature that encrypts all data on a computing device in which user authentication is required from a boot-up stage. In the event that the user forgets the password, a recovery key or an encryption key can be used as a backup to access the device. The enterprise organization can store the recovery key on behalf of a user of the computing device. Oftentimes, an administrative user or an information technology (IT) support worker manages access the recovery key. For example, when a user forgets their passwords, the user has to go to the IT support worker to retrieve their recovery key. Oftentimes, the IT support worker may communicate the recovery key in an insecure manner, such as through electronic communication (e.g., via email or text message) or by writing it down on paper. By using these insecure methods, the recovery key is vulnerable to be copied in the event that the electronic communication and/or the paper is intercepted by an unauthorized user.

The present disclosure includes various examples of providing a user access to a recovery key of a managed user device and automating the rotation of the recovery key after it has been accessed by the user. The user can access the recovery key from a management service without the assistance of an IT support worker. Then, the management service can instruct the managed user device to rotate the recovery key and provide a new recovery key to the management service after it has been generated.

Figure 1:
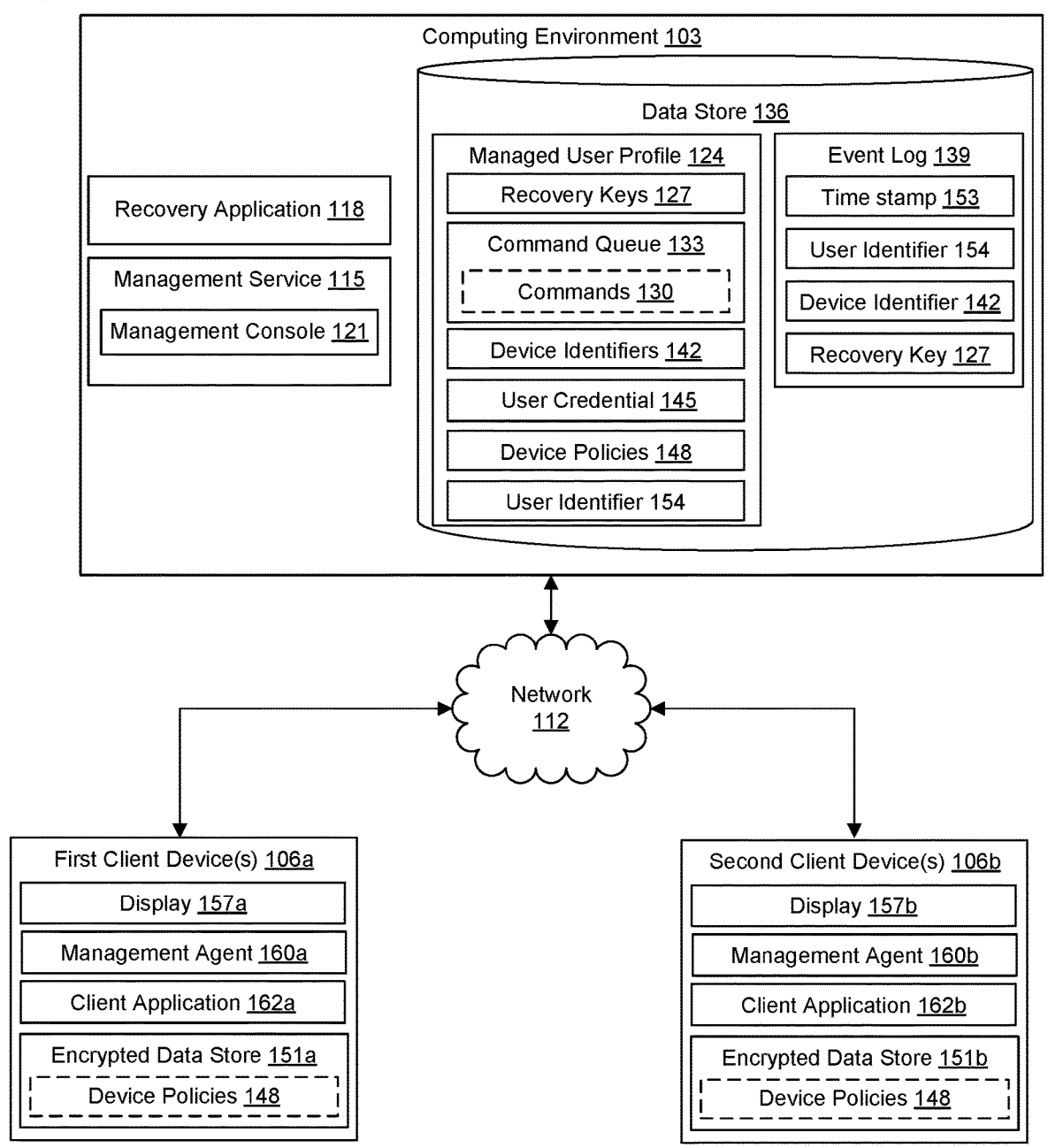
FIG. 1 is a schematic block diagram depicting an example of a network environment according to examples of the disclosure.

Beginning with FIG. 1, shown is an example of a networked environment 100. The networked environment 100 includes a computing environment 103, a first client device 106a, and a second client device 106b, which are in data communication with each other across a network 112. The network 112 includes wide area networks (WANs) and local area networks (LANs). These networks can include wired or wireless components or a combination thereof. Wired networks can include Ethernet networks, cable networks, fiber optic networks, and telephone networks, such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (e.g., WI-Fi®), BLUETOOTH® networks, microwave transmission networks, as well as other networks relying on radio broadcasts. The network 112 can also include a combination of two or more networks 112. Examples of networks 112 can include the Internet, intranets, extranets, virtual private networks (VPNs), and similar networks.

The computing environment 103 can include, for example, a server computer or any other system providing computing capability. Alternatively, the computing environment 103 can employ a plurality of computing devices that can be arranged, for example, in one or more server banks or computer banks or other arrangements. These computing devices can be located in a single installation or can be distributed among many different geographical locations. For example, the computing environment 103 can include a plurality of computing devices that together can include a hosted computing resource, a grid computing resource or any other distributed computing arrangement. In some cases, the computing environment 103 can correspond to an elastic computing resource where the allotted capacity of processing, network, storage, or other computing-related resources can vary over time.

The components executed on the computing environment 103 can include a management service 115, a recovery application 118, and other applications, services, processes, systems, engines, or functionality not discussed in detail herein. The management service 115 is executed in the computing environment 103 to monitor and manage the operation of the first client devices 106a, the second client device 106b, (collectively "the client devices 106"), and potentially other devices. The management service 115 can regulate data accesses locally on the client devices 106 and access to networked resources associated with the computing environment 103. Additionally, the management service 115 can regulate the use of device resources and the application functionality executed on the client device.

In some examples, the management service 115 can include a management console 121, which facilitates the management of the client devices 106 by administrators. For instance, the management console 121 generates user interfaces that are rendered on a display device to facilitate administrators operating and interacting with the management service 115. Such user interfaces facilitate an administrator inputting commands or other information for the management service 115. The commands can include specifying a configuration profile for one or more client devices 106 to be managed by the management service 115. The commands can include specifying one or more managed user profiles 124 for one or more client devices 106. The information can include data, applications, or application functionality that is to be accessible or inaccessible for a specified user profile 124. The user interfaces also include, for example, presentations of statistics or other information regarding the client devices 106 that are managed by the management service 115.

The recovery application 118 can manage access to recovery keys 127 associated with the client device 106. The recovery application 118 can interface with the client device 106 in order to communicate a recovery key 127 to a client device 106. Additionally, the recovery application 118 can interface with the management service 115 to generate commands 130 for a command queue 133 of a client device 106.

The computing environment 103 also includes a data store 136. The data stored in the data store 136 can include one or more managed user profiles 124, event logs 139, and potentially other data. The managed user profile 124 can represent a networked user account associated with a user of an enterprise or an organization. Additionally, the managed user profile 124 can include data related to the operations of one or more client devices 106 associated with the user. The managed user profile 124 is managed by the management service 115. The managed user profile 124 can include data such as, recovery keys 127, a command queue 133, device identifiers 142, user credentials 145, device policies 148, and other potential data. In some examples, a user registers or enrolls their client device 106 to be managed by the management service 115.

The recovery key 127 can represent data used to access an encrypted data store of a client device 106. In some instances, the recovery key 127 can be an encryption key used to decrypt data in the encrypted data store 151a. For example, the recovery key 127 could be a 256-bit key as used with XTS-AES-128 encryption. Oftentimes, the recovery key 127 can be used an alternative to a user password for accessing an encrypted client device 106. When a user forgets their password, the user can use the recovery key 127 for authentication and logging into their client device 106. In some examples, the recovery key 127 can be generated by the operating system of the client device 106. The recovery key 127 can be stored in the data store 136 of the computing environment 103 on behalf of the user of the client device 106.

The command queue 133 can be a list of command instructions 130 for a client device 106. The command queue 133 can be managed by the management service 115. The command instructions 130 can be communicated to the client device 106 on a periodic interval, upon the client device 106 checking-in with the management service 115, or at other suitable times.

The device identifier 142 can represent a unique identifier for each client device 106 being managed by the management service 115. In some examples, the device identifier 142 can be a device serial number or other suitable device identifiers. In some cases, a managed user profile 124 for a user may have multiple device identifiers 142. For example, a user's managed user profile 124 may have a first device identifier 142 associated with a laptop and a second device identifier 142 associated with a mobile phone.

The user credential 145 can be used to authenticate a client device 106 in order to access the computing environment 103. The user credential 145 can represent a password, an authentication token, and other suitable authentication credentials.

A device policy 148 can specify how a particular client device 106 is to be managed or the operating conditions the client device 106 can operate under. The device policy 148 can also represent a collection of settings for a particular client device 106 related to accessible and inaccessible device resources, data, application functionality, and other suitable access controls. For instance, a device policy 148 can specify that the first client device 106 turn on a full-disk encryption feature, such as FileVault within macOS® or BitLocker from Microsoft®. Another device policy 148 can specify which resources the management service 115 is permitted to provide to a client device 106. As an example, a device policy 148 can specify whether the management service 115 is to provide an email service or a calendar service to a client device 106. In other instances, the device policy 148 can specify which features of an email service are accessible to the client device 106. In other examples, the device policy 148 can specific which device resources the client device 106 can access. For instance, the device policy 148 can prohibit the use of a camera, a microphone, or wireless communication transceivers on the client device 106.

The event log 139 can be used to log access instances to the recovery keys 127. The event log 139 can be used to provide a history of users that were shown or provided the recovery key 127. In some examples, an access instance can include an instance in which the computing environment 103 renders a recovery key 127 for display on a client device 106. An entry in the event log can include audit log data such as, a time stamp 153, a user identifier 154, a device identifier 142, a recovery key 127, and other potential data. The time stamp 153 can represent a date and a time of day at which the recovery key 127 was rendered on a display. The user identifier 154 can represent a user profile or user account that accessed the recovery key 127. Further, the event log 129 can include the device identifier 142 of a client device 106 that was requested and the recovery key 127 that was shown on a display. Accordingly, in the event of suspicious activity occurring on the client device, the event log 139 can be useful to identify which users accessed the recovery key 127 and at what time.

First client device 106a and second client device 106b can be representative of a plurality of managed client devices 106 that can be coupled to the network 112. The client devices 106 can include, for example, a processor-based system such as a computer system. Examples of these computer systems can include a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), or other devices with like capability. The client device 106 can include one or more displays 157, such as liquid crystal displays (LCDs), gas plasma-based flat panel displays, organic light emitting diode (OLED) displays, electrophoretic ink ("E-ink") displays, projectors, or other types of display devices.

The client device 106 can be configured to execute various applications such a management agent 160 and a client application 162. The client device 106 can also include a encrypted data store 151, and other suitable components. The client application 162 can cause a user interface to be rendered on a display. The encrypted data store 151 can refer to a portion or all data on the client device 106 as being encrypted and password-protected. In some instances, the encrypted data store 151 can also include a command queue 133, device policies 148, and other suitable data that has transmitted from the computing environment 103. The device policies 148 can represent one or more a policies that have been received from the computing environment 103. In some examples, the device policies 148 can direct the client device 106 to implement one or configuration settings.

The management agent 160 can be executed in the client device 106, for example, to monitor and manage data, software components, and hardware components with respect to the client device 106. The management agent 160 can communicate with the management service 115 to facilitate the management service 115 in monitoring and managing the client device 106. In this context, the first client device 106a and the second client device 106b can be referred as managed client devices 106. As an example, the management agent 160 transmits data that indicates the status of properties and settings for the client device 106, as well as one or more device policies 148 currently applied to the client device 106 or the current user of the client device 106. The management agent 160 can apply and/or enforce one or more device policies 148. In one example, the management agent 160 can enforce a device policy 148 that specifies enabling full disk encryption and transmitting the recovery key 127 to the computing environment 103. In another example, the management agent 160 functions as a device management service that operates as a portion of an operating system for the client device 106. In another example, the management agent 160 functions as a device management agent that operates in the application layer of the client device 106. The management agent 160, in other examples, can include an application wrapper that interfaces with a software component to facilitate overseeing, monitoring, and managing resources for the client device 106. In alternative examples, the management agent 160 includes a portion of an application that was developed, for example, using a Software Development Kit (SDK) so that the monitoring and management functionality is provided using the application.

The client application 162 can represent various applications and software programs executed on the client device 106, such as a web browser, and an operating system. For example, a web browser may be used to access a uniform resource location (URL) (e.g., a website) associated with the recovery application 118. In one instance, a client device 106 may be used to access the recovery key 127 by a URL associated with the recovery application 118.

Next, a general description of the operation of the various components of the networked environment 100 is provided. To begin, a user can register or enroll a first client device 106a, such as a laptop, to be managed by the management service 115. The user can also enrolled a second client device 106b, such as a mobile phone, to be managed by the management service 115.

During enrollment or according to a device policy 148, the management agent 160 can configure a setting of the first client device 106 that encrypts its data store 151a. For example, the setting can active a full-disk encryption feature of the operating system for the first client device 106. One non-limiting example of full-disk encryption service includes FileVault, which is available on several macOS® operating system platforms. Another example includes Bit-Locker, which is available on various Microsoft® Windows® platforms.

During the encryption process, the operating system can generate a recovery key 127 as alternative method for decrypting data stored on the first client device 106a. Typically, upon powering on the device, the first client device 106a can request a password and a user name for authenticating a user before booting up the operating system. After the user has been authenticated, the operating system can start and log on the user in with a managed user profile 124 associated with the user identifier 154.

Subsequently, in another power-on instance, the user may not be able to authenticate their user name on the first client device 106a for a variety of reasons. In some scenarios, the user may have forgotten their password. In another scenario, the operating system of the first client device 106 may not accept the correct password because of an operating system bug.

In these scenarios, the user can request a recovery key 127 through a second client device 106b, such as a mobile phone or a tablet device. The second client device 106b can be authenticated to access the recovery application 118. In some instances, the authentication may involve providing a password, an authentication (e.g. single sign-on) token, a biometric identifier, or other suitable authentication techniques. In some cases, the recovery application 118 can be accessed by a web site URL or by an application executed on the second client device 106b. For example, functionality of the recovery application 118 can be integrated into the management agent 160 executed on the second client device 106b. The management agent 160 can render user interfaces that allow the user to request a recovery key 127 for the first client device 106a. The user interfaces can involve enabling the user to select a device identifier 142 associated with the first client device 106a and to select a request recovery key user interface component.

Upon receiving the request, the recovery application 118 or the management agent 160 can render the recovery key 127 on the display 157b of the second client device 106b. Then, the recovery application 118 can generate an entry into the event log 139. The entry can indicate a record of a user identifier 154 of the requesting user, the requested device identifier 142, the displayed recovery key 127, and a time stamp 153.

The recovery application 118 can generate a key rotation command for the first client device 106a to rotate or regenerate the recovery key 127. In some instances, the recovery application 118 can start a timer and wait a predefined period of time before putting the key rotation command in the command queue 133 of the first client device 106a.

Next, the user can use the recovery key 127 to unlock the first client device 106a. After being unlocked, the first client device 106 can check-in with the management service 115 in order to retrieve commands 130 stored in the command queue 133. Upon receiving the key rotation command, the first client device 106 can cause the recovery key 127 to be rotated. In some examples, the key rotation can involve executing an operating system application programming interface (API) call that causes the operating system to generate a new recovery key 124. After the new recovery key 127 has been generated, the first client device 106a can transmit it to the computing environment 103 to be stored in association with a managed user profile 124 and/or a device identifier 142.

In another non-liming example, the second client device 106b can play an audible file that states the recovery key 127. In this example, the second client device 106b can be a smart speaker, a personal assistant device, or other suitable device with a speaker. After the audible file has been played at the second client device 106b, the recovery application 118 can generate the key rotation command for the first client device 106a.

Figure 2:
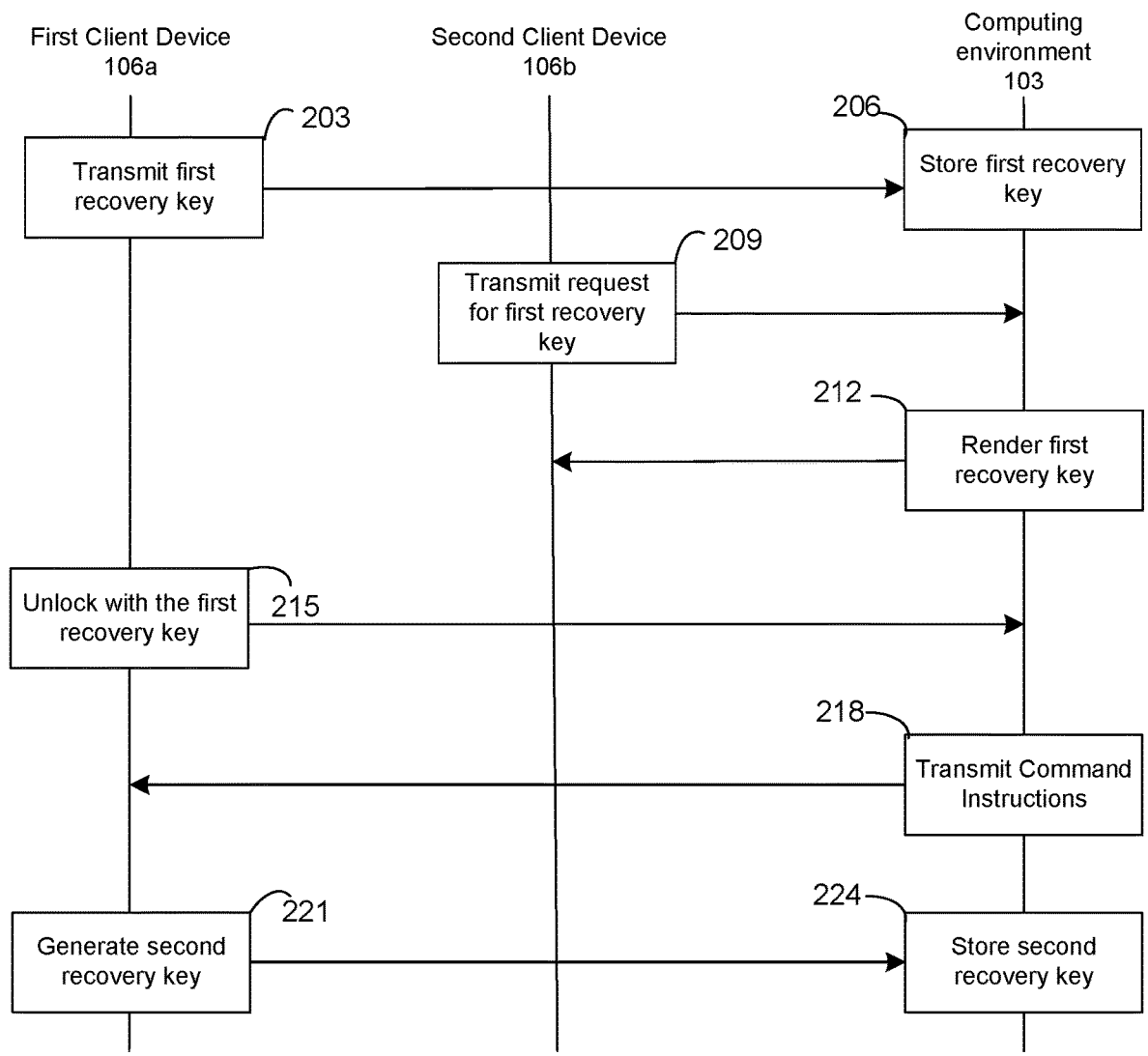
FIG. 2 is an example sequence diagram illustrating functionality implemented by components of the networked environment in FIG. 1.

Referring next to FIG. 2, shown is an example of a sequence diagram illustrating functionality implemented by components of the networked environment 100 in FIG. 1. FIG. 2 assumes that the first client device 106a and the second client device 106b are managed by the computing environment 103. Accordingly, the computing environment 103 can monitor and control the operations of the client devices 106.

Beginning at step 203, the first client device 106a can transmit a first recovery key 127 to the computing environment 103. In some examples, the first recovery key 127 can be generated by the operating system for the first client device 106a. As part of encrypting the data store 151a, the operating system of the first client device 106a can generate the first recovery key 127 as an alternative to a user password for accessing the operating system and data stored in the encrypted data store 151a.

At step 206, the computing environment 103 can store the first recovery key 127 in association with a managed user profile 124 and/or a device identifier 142. Thus, the first recovery key 127 can be stored and managed on behalf of the user of the first client device 106a.

At step 209, the second client device 106b can transmit a request to access the first recovery key 127. The first client device 106a and the second client device 106b can be associated with a user at the computing environment 103. Both client devices 106 may be associated with the managed user profile 124 of the user. In some instances, the computing environment 103 can check whether the first client device 106 is accessible over the network 112 prior to the rendering the recovery key 127 on the second client device 106b. A request to access the recovery key 127 may be an indication of malicious activity when the operating system of the first client device 106a is accessible to the user and the first client device 106a is connected to the network 112.

At step 212, the computing environment 103 can render the first recovery key 127 for display on the second client device 106b. In some instances, the first recovery key 127 may be displayed only for a predetermined period of time. After the period of time has expired, the first recovery key 127 may be removed from the display 157b of the second client device 106b.

At step 215, the first recovery key 127 can be used to authenticate a user on the first client device 106a. Upon being authenticated, the first client device 106a can unlock and allow for the operating system to begin executing. At this point, the first client device 106a can check-in or notify the computing environment 103 that is ready to retrieve commands 130 from its command queue 133.

At step 218, the computing environment 103 can transmit the commands 130 to the first client device 106b. One of the commands can include an instruction to rotate the first recovery key 127. In some instances, the computing environment 103 can wait a predetermined period time prior to storing the key rotation command in the command queue 133. IT support workers may set this period of time in order to give the user time to use the first recovery key 127.

At step 221, the first client device 106a cause its operating system to generate a second recovery key 127. The second recovery key 127 can replace the first recovery key 127. The first client device 106a can transmit the second recovery key 127 to the computing environment 103.

At step 224, the computing environment 103 can store the second recovery key 127 in association with the first client device 106a. In some instances, the second recovery key 127 can be stored in association with a device identifier 142 of the first client device 106b and/or in association with a managed user profile 124 of the user.

Figure 3:
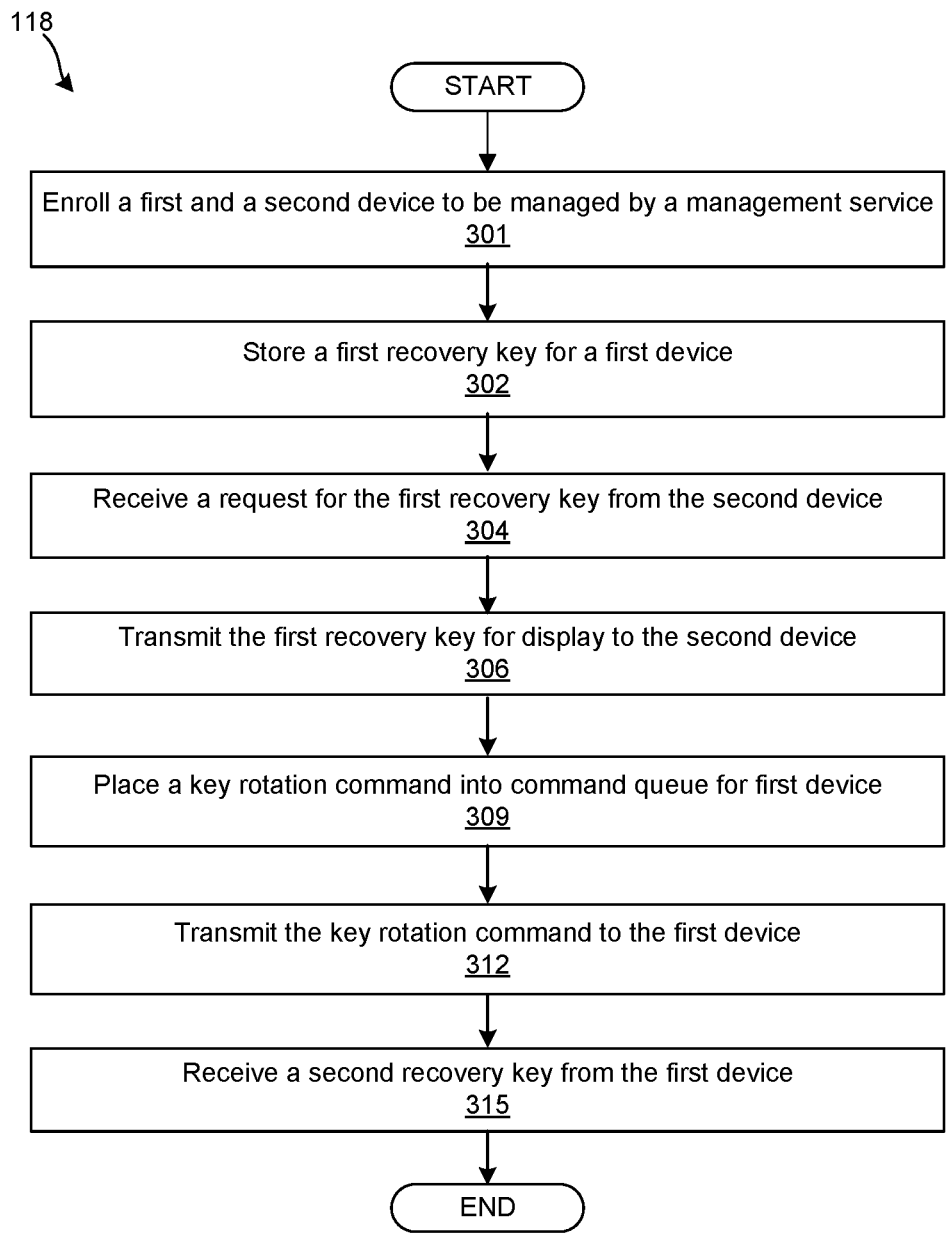
FIG. 3 is a flow chart depicting the operation of an example of a component of the network environment of FIG. 1.

Moving on to FIG. 3, shown is a flowchart depicting an example of the operation of a portion of the recovery application 118. It is understood that the flowchart of FIG. 3 provides merely an example of the many different types of functional arrangements that can be employed to implement the portion of the recovery application 118 as described herein. As an alternative, the flowchart of FIG. 3 can be viewed as depicting an example of elements of a method implemented by the recovery application 118 in some implementations. Further, in some implementations, a portion or all of aspects of FIG. 3 can be performed by the management service 115.

Beginning with step 301, the recovery application 118 can enroll a first client device 106a and a second client device 106b to be managed by a management service 115. During the enrollment process, the management service 115 can transmit a device policy 148 to the first client device 106a and the second client device 106b. In some examples, the device policy 148 for the first client device 106a can configure it to enable full-disk encryption. Upon enabling the full-disk encryption, the operating system can generate a recovery key 127 for the first client device 106a.

At step 302, the recovery application 118 store the recovery key 127 for the first client device 106a. The recovery key 127 can be stored in association with a manage user profile 124 and/or a device identifier 142. In other words, the recovery key 127 is stored on behalf of the user of the first client device 106a.

At step 304, the recovery application 118 can receive a request for the recovery key from the second client device 106b. In some examples, prior to receiving the request the recovery application 118 and/or the management service 115 can validate a credential provided by the second client device 106b. In some examples, the computing environment 103 may have a single sign-on feature that enables an authentication token generated from a previous sign-on to used for authenticating the second client device 106b.

At step 306, the recovery application 118 can render the recovery key 127 on a display 157b of the second client device 106b. In some examples, user interfaces can be generated for selecting a particular device identifier 142 and/or selecting a user interface component that causes the recovery key 127 to be displayed. Upon displaying the recovery key 127, the recovery application 118 can store an entry into the event log 139 that provides a record of displaying the recovery key 127. The entry can include a day, a time, the requested device identifier 142, the displayed recovery key 127, a user identifier 154, and other suitable access data associated with displaying the recovery key 127.

At step 309, the recovery application 118 can generate a key rotation command for the first client device 106a. In some examples, the key rotation command can be stored in a command queue 133 for the first client device 106a. The first client device 106a can retrieve the key rotation command after checking-in with the computing environment, which may occur after the first client device 106a has been unlocked with the recovery key 127. In some instances, the recovery application 118 can wait a predetermined period of time before storing the key rotation command in the command queue 133. As such, a timer can be initiated after the recovery key 127 has been rendered on a display 157. Upon the timer reaching the predetermined period of time, then the key rotation command can be stored in the command queue 133. For example, an IT support worker may set the predetermined period of time to be fifteen minutes through the management console 121.

At step 312, the recovery application 118 can transmit the key rotation command to the first client device 106a. In some instances, the key rotation command can be transmitted to the first client device 106a in response to the first client device 106a checking-in with the computing environment 103. Upon checking-in, the first client device 106a can retrieve commands 130 stored in the command queue 133. In other instances, the first client device 106a can retrieve the commands 130 on a periodic interval.

At step 315, the recovery application 118 can receive a second recovery key 127 from the first client device 106a. The second recovery key 127 can be stored in association with the managed user profile 124 and/or a device identifier 142. The second recovery key 127 can generated by the first client device 106a upon executing the key rotation command provided by the computing environment 103. Then, the management service 115 proceeds to the end.

The flowcharts and sequence diagrams of FIGS. 2 and 3 show examples of the functionality and operation of implementations of components described herein. The components described herein can include hardware, software, or a combination of hardware and software. If embodied in software, each element can represent a module of the code or a portion of the code that includes program instructions to implement the specified logical function(s). The program instructions can be embodied in the form of source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the sequence diagrams and flowcharts of FIGS. 2 and 3 show a specific order of execution, it is understood that the order of execution can differ from that which is shown. The order of execution of two or more elements can be switched relative to the order shown. Also, two or more elements shown in succession can be executed concurrently or with partial concurrence. Further, in some examples, one or more of the elements shown in the flowcharts can be skipped or omitted. In addition, any number of counters, state variables, warning semaphores, or messages could be added to the logical flow described herein, for purposes of enhanced utility, accounting, performance measurement, or troubleshooting aid. It is understood that all variations are within the scope of the present disclosure.

The components described herein, such as at least the computing environment 103 and the client devices 106 can each include at least one processing circuit. The processing circuit can include one or more processors and one or more storage devices that are coupled to a local interface. The local interface can include a data bus with an accompanying address/control bus or any other suitable bus structure. The one or more storage devices for a processing circuit can store data or components that are executable by the one or more processors of the processing circuit.

The components described herein can be embodied in the form of hardware, as software components that are executable by hardware, or as a combination of software and hardware. If embodied as hardware, the components described herein can be implemented as a circuit or state machine that employs any suitable hardware technology. This hardware technology can include one or more microprocessors, discrete logic circuits having logic gates for implementing various logic functions on an application of one or more data signals, application specific integrated circuits (ASICs) having appropriate logic gates, programmable logic devices (e.g., field-programmable gate arrays (FPGAs), and complex programmable logic devices (CPLDs)).

Also, one or more of the components described herein that include software or program instructions can be embodied in any non-transitory computer-readable medium for use by or in connection with an instruction execution system such as a processor in a computer system or other system. The computer-readable medium can contain, store, or maintain the software or program instructions for use by or in connection with the instruction execution system.

The computer-readable medium can include physical media, such as magnetic, optical, semiconductor, or other suitable media. Examples of a suitable computer-readable media include, but are not limited to, solid-state drives, magnetic drives, and flash memory. Further, any logic or component described herein can be implemented and structured in a variety of ways. One or more components described can be implemented as modules or components of a single application. Further, one or more components described herein can be executed in one computing device or by using multiple computing devices.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In this case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

Also, any logic or application described that includes software or code can be embodied in any non-transitory computer-readable medium for use by or in connection with an instruction execution system such as a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described for use by or in connection with the instruction execution system.

It is emphasized that the above-described examples of the present disclosure are merely examples of implementations to set forth a clear understanding of the principles of the disclosure. Many variations and modifications can be made to the above-described examples without departing substantially from the spirit and principles of the disclosure. All modifications and variations are intended to be included herein within the scope of this disclosure.

Therefore, the following is claimed:

1. A system, comprising:
   a computing device; and
   program instructions executable in the computing device that, when executed by the computing device, cause the computing device to:
   generate a first recovery key from an encryption of a data store associated with the computing device;
   transmit to a management service the first recovery key in an instance in which the data store has been encrypted;
   decrypt the encrypted data store based on an input of the first recovery key to the computing device;
   retrieve a first key rotation command from a command queue of the management service, the first key rotation command including an instruction to rotate the first recovery key;
   generate a second recovery key based on rotating the first recovery key according to the instruction to rotate the first recovery key; and
   transmit the second recovery key to the management service.

2. The system of claim 1, wherein the instruction to rotate the first recovery key comprises executing an application programming interface command of an operating system for generating the second recovery key.

3. The system of claim 1, wherein the encryption of the data store is performed in an instance in which a device policy has been received from the management service, wherein the device policy comprises an encryption instruction to encrypt the data store associated with the computing device.

4. The system of claim 1, wherein retrieving the first key rotation command from the command queue of the management service further comprising checking the command queue on a periodic interval.

5. The system of claim 1, wherein the computing device comprises a first computing device, and further comprises program instructions executable in the computing device that, when executed by the computing device, cause the first computing device to:
   display a user interface for requesting a third recovery key associated with a second computing device to the management service, wherein the user interface comprises a user interface component for selecting a device identifier for the second computing device; and
   receive the third recovery key associated with the second computing device from the management service in an instance in which the selection of the device identifier for the second computing device has been made.

6. The system of claim 5, further comprising program instructions executable in the computing device that, when executed, further cause the first computing device to:
   display, for the first computing device, the third recovery key for a predetermined period of time; and
   remove the third recovery key from the display in an instance in which the predetermined period of time has expired.

7. The system of claim 5, wherein the management service has a management data store, and the management data store comprises a managed user profile associated with the first computing device and the second computing device.

8. A non-transitory computer-readable medium embodying program instructions executable in a computing device that, when executed by the computing device, cause the computing device to at least:
   generate a first recovery key from an encryption of a data store associated with the computing device;
   transmit to a management service the first recovery key in an instance in which the data store has been encrypted;
   decrypt the encrypted data store based on an input of the first recovery key to the computing device;
   retrieve a first key rotation command from a command queue of the management service, the first key rotation command including an instruction to rotate the first recovery key;
   generate a second recovery key based on rotating the first recovery key according to the instruction to rotate the first recovery key; and
   transmit the second recovery key to the management service.

9. The non-transitory computer-readable medium of claim 8, wherein the instruction to rotate the first recovery key comprises executing an application programming interface command of an operating system for generating the second recovery key.

10. The non-transitory computer-readable medium of claim 8, wherein the encryption of the data store is performed in an instance in which a device policy has been received from the management service, wherein the device policy comprises an encryption instruction to encrypt the data store associated with the computing device.

11. The non-transitory computer-readable medium of claim 8, wherein the program instructions, when executed, further cause the computing device to at least:
   retrieve the first key rotation command from the command queue of the management service further comprising checking the command queue on a periodic interval.

12. The non-transitory computer-readable medium of claim 8, wherein the computing device comprises a first computing device, and the program instructions executable in the computing device that, when executed by the computing device, cause the first computing device to at least:
   display a user interface for requesting a third recovery key associated with a second computing device to the management service, wherein the user interface comprises a user interface component for selecting a device identifier for the second computing device; and
   receive the third recovery key associated with the second computing device from the management service in an instance in which the selection of the device identifier for the second computing device has been made.

13. The non-transitory computer-readable medium of claim 12, wherein the program instructions, when executed, further cause the computing device to:
- display, for the first computing device, the third recovery key for a predetermined period of time; and
- remove the third recovery key from the display in an instance in which the predetermined period of time has expired.

14. The non-transitory computer-readable medium of claim 12, wherein the management service has a management data store, and the management data store comprises a managed user profile associated with the first computing device and the second computing device.

15. A computer-implemented method, comprising:
- generating a first recovery key from an encryption of a data store associated with a computing device;
- transmitting to a management service the first recovery key in an instance in which the data store has been encrypted;
- decrypting the encrypted data store based on an input of the first recovery key to the computing device;
- retrieving a first key rotation command from a command queue of the management service, the first key rotation command including an instruction to rotate the first recovery key;
- generating a second recovery key based on rotating the first recovery key according to the instruction to rotate the first recovery key; and
- transmitting the second recovery key to the management service.

16. The computer-implemented method of claim 15, wherein the instruction to rotate the first recovery key comprises executing an application programming interface command of an operating system for generating the second recovery key.

17. The computer-implemented method of claim 15, wherein the encryption of the data store is performed in an instance in which a device policy has been received from the management service, wherein the device policy comprises an encryption instruction to encrypt the data store associated with the computing device.

18. The computer-implemented method of claim 15, wherein retrieving the first key rotation command from the command queue of the management service further comprising checking the command queue on a periodic interval.

19. The computer-implemented method of claim 15, wherein the computing device comprises a first computing device, and further comprising:
- displaying a user interface for requesting a third recovery key associated with a second computing device to the management service, wherein the user interface comprises a user interface component for selecting a device identifier for the second computing device; and
- receiving the third recovery key associated with the second computing device from the management service in an instance in which the selection of the device identifier for the second computing device has been made.

20. The computer-implemented method of claim 19, further comprising:
- displaying, for the first computing device, the third recovery key for a predetermined period of time; and
- removing the third recovery key from the display in an instance in which the predetermined period of time has expired.

* * * * *